(12) United States Patent
Yang

(10) Patent No.: US 11,229,007 B2
(45) Date of Patent: Jan. 18, 2022

(54) MESSAGE TRANSMISSION METHOD, APPARATUS AND SYSTEM

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/607,333

(22) PCT Filed: Apr. 28, 2017

(86) PCT No.: PCT/CN2017/082445
§ 371 (c)(1),
(2) Date: Oct. 22, 2019

(87) PCT Pub. No.: WO2018/195917
PCT Pub. Date: Jan. 11, 2018

(65) Prior Publication Data
US 2020/0374832 A1 Nov. 26, 2020

(51) Int. Cl.
*H04W 68/00* (2009.01)
*H04W 68/02* (2009.01)
*H04W 88/04* (2009.01)

(52) U.S. Cl.
CPC ......... *H04W 68/02* (2013.01); *H04W 68/005* (2013.01); *H04W 88/04* (2013.01)

(58) Field of Classification Search
CPC .... H04W 68/02; H04W 68/005; H04W 88/04
(Continued)

(56) References Cited

U.S. PATENT DOCUMENTS 8,818,427 B1 8/2014 Goyal et al.
8,897,199 B2 * 11/2014 Li .................. H04L 1/1812
370/315

(Continued)

FOREIGN PATENT DOCUMENTS

CN 104812069 7/2015
CN 104938023 9/2015
(Continued)

OTHER PUBLICATIONS

ISR for PCT/CN2017/082445, Jan. 26, 2018.
(Continued)

*Primary Examiner* — Amancio Gonzalez
(74) *Attorney, Agent, or Firm* — Hodgson Russ LLP

(57) ABSTRACT

The present application relates to the application field of communication technologies. Provided are a message transmission method, apparatus and system. The method comprises: obtaining two sets of paging transmission information, the two sets of paging transmission information comprising paging transmission information of a relay user equipment (UE) and paging transmission information of a remote UE, the paging transmission information being used for indicating the transmission position of a paging message, and the relay UE being a relay device between a base station and the remote UE; and sending the paging message to the relay UE according to the two sets of paging transmission information. The present application can reduce the network signaling overheads. The present application is used for paging message transmission in a mobile communication system.

16 Claims, 7 Drawing Sheets

(58) Field of Classification Search
USPC .......................................................... 455/458
See application file for complete search history.

(56) References Cited

U.S. PATENT DOCUMENTS

| | | | | |
|---|---|---|---|---|
| 10,015,774 | B1* | 7/2018 | Oroskar | H04W 8/08 |
| 10,039,081 | B2* | 7/2018 | Zhang | H04W 68/025 |
| 10,326,517 | B2* | 6/2019 | Seo | H04W 76/14 |
| 10,708,754 | B2* | 7/2020 | Xu | H04W 40/02 |
| 10,757,681 | B2* | 8/2020 | Kim | H04W 76/10 |
| 11,012,972 | B2* | 5/2021 | Hong | H04W 68/005 |
| 2012/0220214 | A1* | 8/2012 | Du | H04W 68/005 455/7 |
| 2019/0230723 | A1* | 7/2019 | Kim | H04W 68/02 |
| 2019/0373578 | A1* | 12/2019 | Hong | H04W 76/28 |
| 2020/0015192 | A1* | 1/2020 | Chun | H04W 60/00 |
| 2020/0077253 | A1* | 3/2020 | Kim | H04W 76/27 |

FOREIGN PATENT DOCUMENTS

| | | |
|---|---|---|
| CN | 106162676 | 11/2016 |
| CN | 106255227 | 12/2016 |
| EP | 31620211 | 8/2014 |
| EP | 3160211 | 4/2017 |
| WO | 2012043524 | 4/2012 |

OTHER PUBLICATIONS

Intel Corporation, "Paging for remote UE," 3GPP TSG RAN WG2 Meeting #97, R2-1701303, Feb. 2017, 4 pages.

Nokia et al., "Paging and Idle Mode procedures of remote UE," 3GPP TSG-RAN WG2 Meeting #97, R2-1701084, Feb. 2017, 4 pages.

Sony, "Paging via Relay," 3GPP TSG RAN WG2 Meeting #97, R2-1701494, Feb. 2017, 4 pages.

EPO, Office Action for EP Application No. 17907178.2, dated Jan. 23, 2020.

Qualcomm Incorporated et al., "Revision of SI: Further Enhancements LTE Device to Device, UE to Network Relays for IoT and Wearables," 3GPP TSG RAN Meeting #72, RP-161303, Jun. 2016, 7 pages.

KIPO, Office Action for KR Application No. 10-2019-7032593, dated Mar. 28, 2021.

JPO, Office Action for JP Application No. 2019-556686, dated Apr. 2, 2021.

Intel Corporation, "Report of email discussion [97#66][LTE/FeD2D]—Paging", 3GPP TSG RAN WG2#97bis, Apr. 7, 2017.

Sony, "Paging via Relay", 3GPP TSG RAN WG2 Meeting #97bis, Apr. 7, 2017.

IPI, Office Action for IN Application No. 201917044485, dated Feb. 10, 2021.

KIPO, Office Action for KR Application No. 10-2019-7032593, dated Jan. 28, 2021.

\* cited by examiner

MESSAGE TRANSMISSION METHOD, APPARATUS AND SYSTEM

CROSS-REFERENCE TO RELATED APPLICATION

This application is a U.S. national phase application of International Application No. PCT/CN2017/082445, filed Apr. 28, 2017, the entire disclosure of which is incorporated herein by reference.

TECHNICAL FIELD

The present disclosure relates to the application field of communication technologies, and more particularly, to a message transmitting method, apparatus and system.

BACKGROUND

Device-to-Device (D2D for short) communication technology refers to a communication method in which two peer-to-peer User Equipment (UE for short) communicate directly. Further Enhance Device-to-Device (FeD2D for short) communication technology is an improved technology based on D2D communication technology. In the FeD2D communication technology, a relay UE, as a relay equipment between a remote UE and a base station, can forward data between the remote UE and the base station, and UE contexts of the relay UE and the remote UE are saved in the base station.

When the UE is in an idle state and a network side device needs to perform data interaction with the UE, the base station may inform the UE by using a paging message. In the current FeD2D communication technology, the base station may calculate paging transmission information according to an IMSI of the relay UE, the paging transmission information including information of a Paging Occasion (PO for short) and a Paging Frame (PF for short), and sends a paging message to the relay UE based on the paging transmission information.

However, in the current FeD2D communication technology, the base station needs to perform data interaction with the remote UE. If the paging transmission information is calculated according to the IMSI of the relay UE, the base station needs to obtain a connection status of the relay UE and the remote UE in real time through signaling, so as to ensure that the relay UE can transmit the paging message to the remote UE after acquiring the paging message. However, more signaling will lead to a relatively high network signaling overhead.

SUMMARY

In order to solve the problem that the current network signaling overhead is high, the present disclosure provides a message transmitting method, apparatus and system. The technical solutions are as follows.

According to a first aspect, there is provided a message transmitting method applied to a base station, including:

acquiring two sets of paging transmission information, the two sets of paging transmission information including paging transmission information of a relay user equipment (UE) and paging transmission information of a remote UE, the paging transmission information being used for indicating a transmission position of a paging message, and the relay UE being a relay equipment between the base station and the remote UE; and sending the paging message to the relay UE based on the two sets of paging transmission information.

Optionally, the sending the paging message to the relay UE based on the two sets of paging transmission information includes:

determining paging transmission information of a target UE from the two sets of paging transmission information, the target UE including at least one of the relay UE and the remote UE; and sending the paging message to the relay UE based on the paging transmission information of the target UE.

Optionally, the paging transmission information of the remote UE includes a plurality of paging transmission information, and the sending the paging message to the relay UE based on the paging transmission information of the target UE includes:

when the target UE includes the remote UE, selecting one target paging transmission information from the paging transmission information of the remote UE; and sending a paging message of the remote UE on a subframe indicated by the target paging transmission information to the relay UE.

Optionally, the selecting one target paging transmission information from the paging transmission information of the remote UE includes:

selecting one target paging transmission information from the paging transmission information of the remote UE based on a selection manner pre-agreed with the relay UE.

Optionally, the selecting one target paging transmission information from the paging transmission information of the remote UE based on the selection manner pre-agreed with the relay UE includes:

randomly selecting one paging transmission information from the paging transmission information of the remote UE as the target paging transmission information.

Optionally, the selecting one target paging transmission information from the paging transmission information of the remote UE based on the selection manner pre-agreed with the relay UE includes:

obtaining reference paging transmission information by calculation according to an IMSI of the remote UE; and selecting one paging transmission information closest to the reference paging transmission information from the paging transmission information of the remote UE as the target paging transmission information.

Optionally, the acquiring the two sets of paging transmission information includes:

acquiring predetermined paging transmission information of the remote UE;

or, obtaining the paging transmission information of the remote UE by calculation according to a pre-configured configuration parameter;

or, obtaining the paging transmission information of the remote UE by calculation according to a pre-configured International Mobile Subscriber Identity (IMSI).

Optionally, the acquiring the two sets of paging transmission information includes:

after receiving a signaling for changing a transmission mode sent by the relay UE, acquiring the two sets of paging transmission information, the signaling for changing a transmission mode being sent after the relay UE establishes a connection with the remote UE.

Optionally, the paging transmission information includes information of a paging occasion and a paging frame.

According to a second aspect, there is provided a message transmitting method applied to a relay user equipment (UE), including:

acquiring two sets of paging transmission information, the two sets of paging transmission information including paging transmission information of the relay user equipment (UE) and paging transmission information of a remote UE, the paging transmission information being used for indicating a transmission position of a paging message, and the relay UE being a relay equipment between a base station and the remote UE; and receiving the paging message sent by the base station based on the two sets of paging transmission information.

Optionally, the receiving the paging message sent by the base station based on the two sets of paging transmission information includes:

monitoring all subframes indicated by the two sets of paging transmission information to receive the paging message sent by the base station.

Optionally, the paging transmission information of the remote UE includes a plurality of paging transmission information, and the receiving the paging message sent by the base station based on the two sets of paging transmission information includes:

selecting one target paging transmission information from the paging transmission information of the remote UE; and monitoring based on a subframe indicated by the target paging transmission information to receive the paging message sent by the base station.

Optionally, the selecting one target paging transmission information from the paging transmission information of the remote UE includes:

selecting one target paging transmission information from the paging transmission information of the remote UE based on a selection manner pre-agreed with the base station.

Optionally, the selecting one target paging transmission information from the paging transmission information of the remote UE based on the selection manner pre-agreed with the base station includes:

obtaining reference paging transmission information by calculation according to an IMSI of the remote UE; and selecting one paging transmission information closest to the reference paging transmission information from the paging transmission information of the remote UE as the target paging transmission information.

Optionally, the acquiring the two sets of paging transmission information includes:

acquiring predetermined paging transmission information of the remote UE;

or, obtaining the paging transmission information of the remote UE by calculation according to a pre-configured configuration parameter;

or, obtaining the paging transmission information of the remote UE by calculation according to a pre-configured International Mobile Subscriber Identity (IMSI).

Optionally, before the acquiring the two sets of paging transmission information, the method further includes:

after the relay UE establishes a connection with the remote UE, sending a signaling for changing a transmission mode to the base station.

Optionally, the paging transmission information includes information of a paging occasion and a paging frame.

According to a third aspect, there is provided a message transmitting apparatus applied to a base station, including:

an acquisition module configured to acquire two sets of paging transmission information, the two sets of paging transmission information including paging transmission information of a relay user equipment (UE) and paging transmission information of a remote UE, the paging transmission information being used for indicating a transmission position of a paging message, and the relay UE being a relay equipment between the base station and the remote UE; and a sending module configured to send the paging message to the relay UE based on the two sets of paging transmission information.

Optionally, the sending module includes:

an information acquisition submodule configured to determine paging transmission information of a target UE from the two sets of paging transmission information, the target UE including at least one of the relay UE and the remote UE; and a sending submodule configured to send the paging message to the relay UE based on the paging transmission information of the target UE.

Optionally, the paging transmission information of the remote UE includes a plurality of paging transmission information, and the sending submodule includes:

a selection submodule configured to, when the target UE includes the remote UE, select one target paging transmission information from the paging transmission information of the remote UE; and a message sending submodule configured to send a paging message of the remote UE on a subframe indicated by the target paging transmission information to the relay UE.

Optionally, the selection submodule is configured to:

select one target paging transmission information from the paging transmission information of the remote UE based on a selection manner pre-agreed with the relay UE.

Optionally, the selection submodule is specifically configured to:

randomly select one paging transmission information from the paging transmission information of the remote UE as the target paging transmission information.

Optionally, the selection submodule is specifically configured to:

obtain reference paging transmission information by calculation according to an IMSI of the remote UE; and select one paging transmission information closest to the reference paging transmission information from the paging transmission information of the remote UE as the target paging transmission information.

Optionally, the acquisition module is configured to:

acquire predetermined paging transmission information of the remote UE;

or, obtain the paging transmission information of the remote UE by calculation according to a pre-configured configuration parameter;

or, obtain the paging transmission information of the remote UE by calculation according to a pre-configured International Mobile Subscriber Identity (IMSI).

Optionally, the acquisition module is configured to:

after receiving a signaling for changing a transmission mode sent by the relay UE, acquiring the two sets of paging transmission information, the signaling for changing a transmission mode being sent after the relay UE establishes a connection with the remote UE.

Optionally, the paging transmission information includes information of a paging occasion and a paging frame.

According to a fourth aspect, there is provided a message transmitting apparatus applied to a relay user equipment (UE), including:

an acquisition module configured to acquire two sets of paging transmission information, the two sets of paging transmission information including paging transmission information of a relay user equipment UE and paging transmission information of a remote UE, the paging transmission information being used for indicating a transmission position of a paging message, and the relay UE being a relay equipment between a base station and the remote UE; and a receiving module configured to receive the paging message sent by the base station based on the two sets of paging transmission information.

Optionally, the receiving module is configured to:

monitor all subframes indicated by the two sets of paging transmission information to receive the paging message sent by the base station.

Optionally, the paging transmission information of the remote UE includes a plurality of paging transmission information, and the receiving module includes:

a selection submodule configured to select one target paging transmission information from the paging transmission information of the remote UE; and a monitoring submodule configured to monitor based on a subframe indicated by the target paging transmission information to receive the paging message sent by the base station.

Optionally, the selection submodule is configured to:

select one target paging transmission information from the paging transmission information of the remote UE based on a selection manner pre-agreed with the base station.

Optionally, the selection submodule is specifically configured to:

obtain reference paging transmission information by calculation according to an IMSI of the remote UE; and select one paging transmission information closest to the reference paging transmission information from the paging transmission information of the remote UE as the target paging transmission information.

Optionally, the acquisition module is configured to:

acquire predetermined paging transmission information of the remote UE;

or, obtain the paging transmission information of the remote UE by calculation according to a pre-configured configuration parameter;

or, obtain the paging transmission information of the remote UE by calculation according to a pre-configured International Mobile Subscriber Identity (IMSI).

Optionally, the apparatus further includes:

a signaling transmission module configured to, before the acquiring the two sets of paging transmission information, and after the relay UE establishes a connection with the remote UE, send a signaling for changing a transmission mode to the base station.

Optionally, the paging transmission information includes information of a paging occasion and a paging frame.

According to a fifth aspect, there is provided a message transmitting system, including: a relay UE, a remote UE and a base station, the base station including any of the message transmitting apparatus according to the third aspect, and the relay UE including any of the message transmitting apparatus according to the fourth aspect.

According to the message transmitting method, apparatus and system provided by the embodiments of the present disclosure, the base station acquires the two sets of paging transmission information, which are the paging transmission information of the relay UE and the paging transmission information of the remote UE respectively. When the base station needs to perform data interaction with the relay UE, the base station sends the paging message to the relay UE based on the paging transmission information of the relay UE; and when the base station needs to perform data interaction with the remote UE, the base station sends the paging message to the relay UE based on the paging transmission information of the remote UE, without needing to consider the connection state of the relay UE and the remote UE, and the relay UE only needs to receive the paging message sent by the base station based on the two sets of paging transmission information, and does not need to consider how many remote UEs connected therewith, thus reducing the network signaling overhead and also reducing the power consumption of the relay UE.

BRIEF DESCRIPTION OF THE DRAWINGS

In order to illustrate the technical solutions of the embodiments of the present disclosure more clearly, the drawings used in the description of the embodiments will be briefly described below. Obviously, the drawings in the following description are merely some embodiments of the present disclosure. For those of ordinary skills in the art, other drawings may also be obtained based on these drawings without paying any creative effort.

DETAILED DESCRIPTION

To make the objectives, technical solutions, and advantages of the present disclosure clearer, the following further describes the embodiments of the present disclosure in detail with reference to the accompanying drawings.

Figure 1:
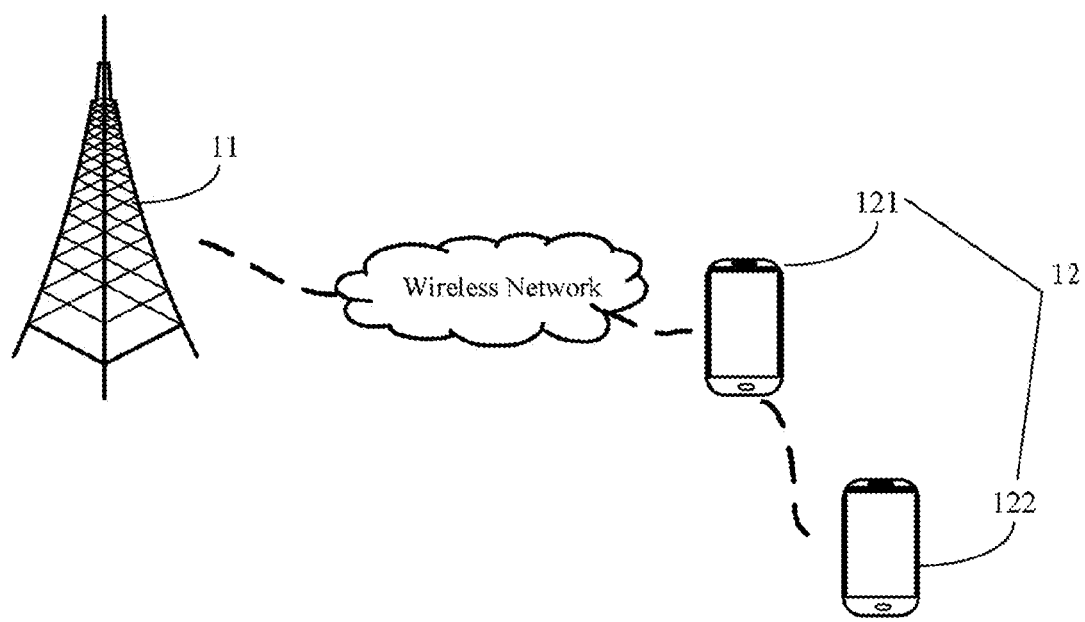
FIG. 1 is a schematic diagram of an implementation environment involved in a message transmitting method provided in some embodiments of the present disclosure.

FIG. 1 illustrates a schematic diagram of an implementation environment involved in a message transmitting method provided by an embodiment of the present disclosure. Referring to FIG. 1, the implementation environment may include a base station 11 and a plurality of UEs 12. The plurality of UEs 12 include a relay UE 121 and a remote UE 122. The relay UE 121 is directly connected with the base station 11 and may transfer information between the base station 11 and the remote UE 122.

In a 5G system, the base station 11 may be a next generation Node B (generation Node B, gNB for short). In a LTE system, the base station 11 may be an evolved Node B (eNB for short). The UE 12 may be a smart phone, a computer, a multimedia player, an electronic reader or a wearable device, etc. A connection may be established between the base station 11 and the relay UE 121 through a wireless network, and a connection between the relay UE 121 and the remote UE 122 may be established through a wireless network. Generally, there may be two states between the base station 11 and the remote UE 122: a Uu direct connection state and a PC5 (the concept of the PC5 is derived from the communication standard TS23.303) relay state. The Uu direct connection state refers to a state that the base station 11 establishes a Radio Resource Control (RRC for short) connection with a Uu interface of the remote UE 122, in which the relay UE 121 does not need to transfer data. The PC5 relay state refers to a state in which the base station 11 and the remote UE 122 perform data transmission via the relay UE 121. For example, the remote UE 122 may be a smart watch, and the relay UE 121 may be a smart phone; the smart watch and the smart phone may establish a Bluetooth connection, and data between the smart watch and the base station is transmitted through the smart phone. For another example, the remote UE 122 may be a first smart phone, and the relay UE 121 may be a second smart phone. The first smart phone may establish a RRC connection with the base station, or a wireless hotspot may be established through the second smart phone, and data between the first smart phone and the base station is transmitted through the second smart phone. It should be noted that, in actual applications, there may be only the PC5 relay state between some base stations 11 and remote UEs 122, that is, the remote UE 122 cannot implement an RRC connection with the base station 11. For example, some smart watches cannot implement an RRC connection with the base station.

In a communication system, when the UE is in an idle state and a network side device needs to perform data interaction with the UE, the base station may inform the UE by using a paging message. At this time, the UE may perform subsequent response only after the paging message has been monitored. A network side, such as a core network, manages a plurality of Tracking Areas (TAC for short). Each TAC has a plurality of base stations. The network side may send the paging message to the base station(s) under the same TAC, and the base station(s) issues the paging message to the UE via a Paging Control Channel (PCCH for short). The paging message usually carries a UE Identification (ID for short) list. If the UE ID list is carried in the paging message received by the UE, the UE may match the UE ID carried in the paging message with its own UE ID to determine whether the paging message is calling the UE itself.

In the paging message, if a paging ID is a S-Temporary Mobile Subscriber Identity (S-TMSI for short), it means that this paging is a normal service call, where S is an abbreviation of System Architecture Evolution (SAE for short); and if the paging ID is an International Mobile Subscriber Identity (IMSI for short), it means that this paging is an abnormal call used for error recovery at the network side. In this case, the UE needs to perform an Attach procedure again. It should be noted that the above-mentioned S-TMSI is a shortened format of a Globally Unique Temporary UE Identity (GUTI for short) to ensure more efficient processing (such as paging and service request) on wireless signaling. The IMSI is a symbol to distinguish UEs, which usually has a total length no more than 15 bits, and is obtained by arranging digits 0 to 9. The IMSI includes a Mobile Country Code (MCC for short). The MCC is a country code of a mobile UE, usually occupying three digits, and the MCC of China is 460. The Mobile Network Code (MNC for short) is a mobile network code, which consists of two or three digits, and is used to identify a mobile communication network to which the mobile UE belongs. For example, the MNC of China Mobile is 00. The Mobile Subscriber Identification Number (MSIN for short) is used to identify mobile subscribers in a certain mobile communication network.

In the current communication system, a Discontinuous Reception (DRX for short) technology is put forward. In the DRX technology, a DRX cycle is defined. In one DRX cycle, the UE may only monitor, at a Paging Occasion (PO) on a corresponding Paging Frame (i.e., PF) whether a Paging-Radio Network Temporary Identity (P-RNTI for short) is carried on a Physical Downlink Control Channel (PDCCH for short), so as to determine whether a paging message is carried on a corresponding Physical Downlink Shared Channel (PDSCH for short). If the P-RNTI is carried on the PDCCH, data on the PDSCH is received according to parameters of the PDSCH indicated on the PDCCH; and if the UE does not resolve the P-RNTI on the PDCCH, it may enter dormancy according to the DRX cycle without receiving the Physical Channel PDSCH. With this mechanism, in one DRX cycle, the UE may only receive the PDCCH at the time when the PO occurs, and then receive the PDSCH as needed. At other time, the UE may be dormant to save power. The embodiments of the present disclosure are applied to this scenario.

Figure 2A:
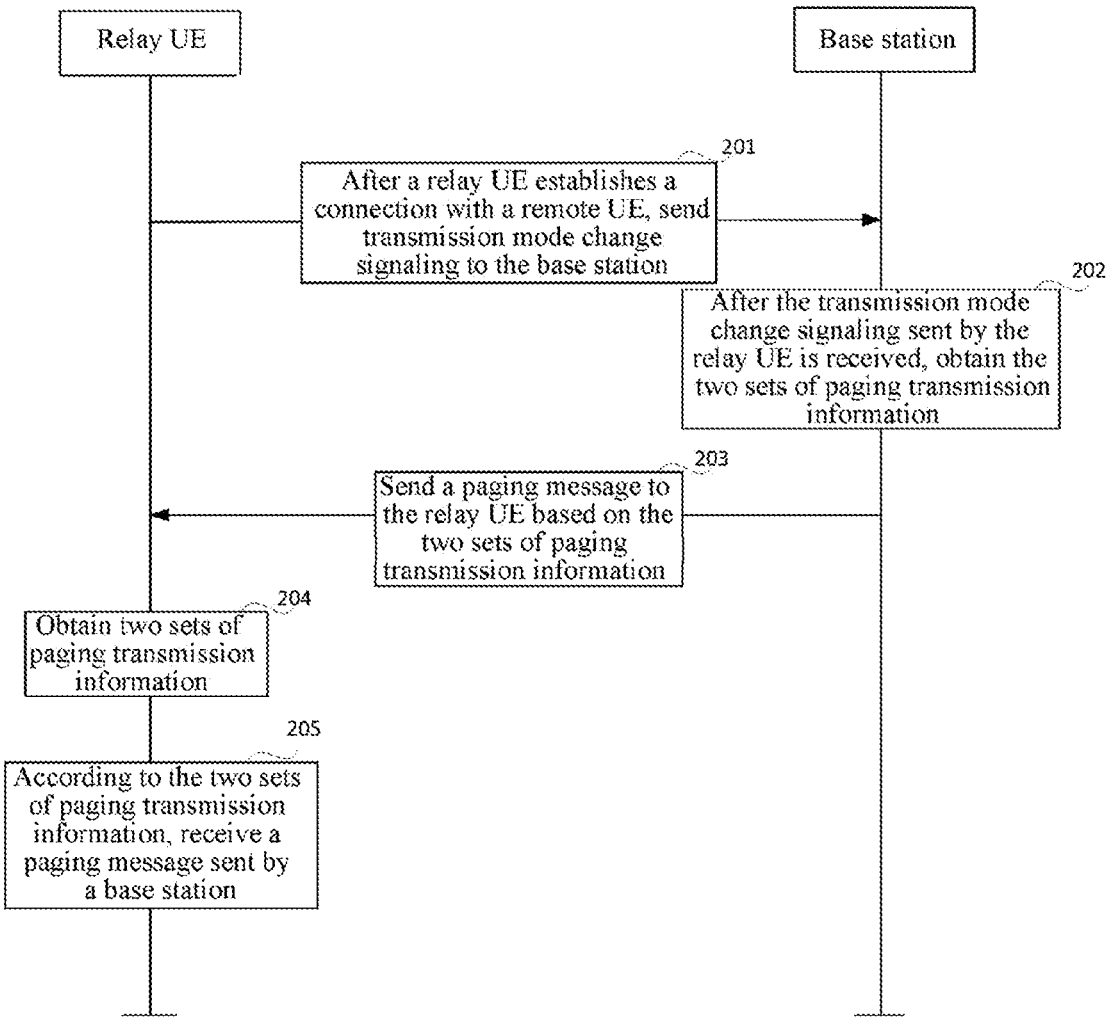
FIG. 2A is a flow chart of a message transmitting method provided by an embodiment of the present disclosure.

The message transmitting method provided by the embodiments of the present disclosure is applied to the above scenario for transmitting the paging message. To be specific, as shown in FIG. 2A, the message transmitting method includes the following steps.

In step 201, after a relay UE establishes a connection with a remote UE, the relay UE sends a signaling for changing a transmission mode to a base station.

In some scenarios, the remote UE may directly establish a RRC connection with the base station or may establish a connection with the base station through the relay UE. For example, in a scenario where the remote UE is a smart phone or a notebook computer, when a connection state of the remote UE is switched from a Uu direct connection state to a PC5 relay state, a transmission mode thereof is changed, i.e. from direct transmission to indirect transmission. In some other scenarios, the remote UE cannot establish an RRC connection with the base station but may establish a connection with the base station through the relay UE. For example, in a scenario where the remote UE is a smart watch or a smartband, when the connection state of the remote UE is switched from a state of not being connected with the relay UE to a state of being connected with the relay, a transmission mode thereof is changed, i.e. from being untransmittable to being transmittable.

After the relay UE establishes a connection with the remote UE, the relay UE may send the signaling for changing a transmission mode to the base station. The signaling for changing a transmission mode may have various kinds of transmitting opportunities, for example, the relay UE may actively send the signaling for changing a transmission mode within a preset time period (e.g., 2 ms) after the connection with the remote UE is established, or passively send the signaling for changing a transmission mode under the trigger of the remote UE within a preset time period after the connection with the remote UE is established. For another example, the relay UE may send the signaling for changing a transmission mode when determining that the remote UE needs data transmission after the connection with the remote UE is established. On one hand, when the remote UE needs data transmission, an instruction for triggering data transmission may be sent to the relay UE firstly, and the relay UE may send the signaling for changing a transmission mode to the base station according to the instruction for triggering data transmission. On the other hand, when the remote UE needs data transmission, data needing to be transmitted may be directly sent to the relay UE, and the relay UE may send the signaling for changing a transmission mode to the base station according to the data; or, the signaling for changing a transmission mode may be directly sent to the base station, and the data to be transmitted is carried in the signaling.

In step 202, after receiving the signaling for changing a transmission mode sent by the relay UE, the base station acquires two sets of paging transmission information.

After receiving the signaling for changing a transmission mode sent by the relay UE, the base station may determine that the relay UE is cascaded to the remote UE based on the signaling for changing a transmission mode sent by the relay UE. Usually, the signaling for changing a transmission mode includes an identification of the remote UE (e.g., an IMSI of the remote UE). Based on this, the base station may also determine which remote UE is specifically connected with the relay UE. Accordingly, the base station may acquire two sets of paging transmission information for use when subsequently sending the paging message.

In the embodiments of the present disclosure, the two sets of paging transmission information include paging transmission information of the relay UE and paging transmission information of the remote UE, the paging transmission information is used for indicating a transmission position of the paging message, the transmission position is a time position, and the paging transmission information may include: information of a PF and a PO. The PF is used to indicate a radio frame sending the paging message, and the PF may include at least one paging occasion in a unit of 10 ms (millisecond), and the PO is used to indicate a subframe sending the paging message in a unit of 1 ms.

The method for the base station to acquire the two sets of paging transmission information mainly includes the following two aspects.

In a first aspect, the base station acquires the paging transmission information of the relay UE.

The method for the base station to obtain the paging transmission information of the relay UE may refer to a conventional method for obtaining the paging transmission information of the relay UE, for example, contents specified in Chapter 7.1 of the communication standard TS36.304, the paging transmission information of the relay UE may be calculated based on an IMSI of the relay UE, and the method for obtaining the paging transmission information of the remote UE may also refer to the following second aspect, which will not be elaborated in the embodiments of the present disclosure.

In a second aspect, the base station acquires the paging transmission information of the remote UE.

There may be a plurality of implementation manners for the base station to obtain the paging transmission information of the remote UE. The following three implementation manners will be taken as examples for illustration in the embodiments of the present disclosure.

In a first implementation manner, the base station acquires predetermined paging transmission information of the remote UE.

Optionally, a management equipment at the network side may pre-configure the paging transmission information of the remote UE and send the paging transmission information to the base station. For example, when the base station is located in an LTE system, the above-mentioned management equipment is a Mobility Management Entity (MME for short) in a core network. Specifically, the network side may send the paging transmission information of the remote UE to the base station through a high layer signaling or a separately configured signaling, and the base station saves the paging transmission information of the remote UE and extracts the paging transmission information of the remote UE when needed. The process in which the base station acquires the predetermined paging transmission information of the remote UE is also the process in which the base station extracts the paging transmission information of the remote UE. It should be noted that the above-mentioned paging transmission information of the remote UE may also be configured in the base station in communication system networking according to a protocol.

Optionally, the base station may calculate the paging transmission information of the remote UE in advance, save the paging transmission information, and extract the paging transmission information when needed. The process in which the base station acquires the predetermined paging transmission information of the remote UE is also the process in which the base station extracts the paging transmission information of the remote UE.

In a second implementation manner, the base station obtains the paging transmission information of the remote UE by calculation according to a pre-configured configuration parameter.

Optionally, the management equipment at the network side may pre-configure the configuration parameter and send the configuration parameter to the base station. For example, when the base station is located in an LTE system, the above-mentioned management equipment is a MME. Specifically, the network side may send the configuration parameter to the base station through a high layer signaling or a separately configured signaling, and the base station saves the configuration parameter and extracts the configuration parameter when the paging transmission information of the remote UE needs to be calculated. It should be noted that the configuration parameter may include: a Paging Cycle and a number of paging cycles (nB for short). It should be noted that the above-mentioned configuration parameter may also be configured in the base station in communication system networking.

In the embodiments of the present disclosure, the paging transmission information of the remote UE may include a plurality of paging transmission information. Optionally, the base station may acquire the pre-configured configuration parameter and a universal set of configurable IMSIs, and obtain the plurality of paging transmission information by calculation respectively according to the configuration parameter and the universal set of the configurable IMSIs, where the plurality of configuration parameters include: a paging cycle and a number of paging cycles.

The above-mentioned plurality of paging transmission information may satisfy the following formula for calculating the paging transmission information:

$$\text{SFN mod } T=(T \text{ div } N)*(\text{UE ID mod } N);$$

$$i\_s=\text{floor}(\text{UE\_ID}/N)\text{mod } Ns;$$

SFN mod T is a paging occasion, T is a duration of the paging cycle, N represents a number of radio frames in one paging cycle, "div" represents division, then T div N represents T/N, UE ID represents a remainder result of the configured IMSI dividing 1024, "mod" represents a remainder operation, then UE_ID mod N represents a remainder after the UE_ID is divided by N; i_s is a paging frame, and Ns is a number of subframes used to transmit paging messages in one radio frame.

The universal set of configurable IMSIs refers to all IMSIs configurable by the UE. For example, 1024 IMSIs may be allocated to the UE, which are 10000000 to 10001023 respectively, then the universal set of configurable IMSIs is 10000000 to 10001023. It should be noted that the above IMSI is an illustrative example only, and the actual IMSI is usually composed of 11 to 15 decimal digits. Optionally, the paging cycle has a duration of 256 radio frames, which is a maximum paging cycle. The number of paging cycles is one sixteenth (1/16) of the duration of the paging cycle, which is a minimum number of paging cycles. By substituting the above 1024 IMSIs, the paging cycles and the number of paging cycles into the above-mentioned formula for calculating paging transmission information, 1024 POs and PFs may be obtained. Although a plurality of paging transmission information may be obtained by calculation using the algorithm, the energy consumption of the relay UE in monitoring the paging message can be effectively reduced due to a relatively long time interval of the paging transmission information, i.e. a relatively low occurrence frequency of the POs.

In a third implementation manner, the base station obtains the paging transmission information of the remote UE by calculation according to a pre-configured IMSI.

Optionally, the management equipment at the network side may pre-configure the IMSI and send the IMSI to the base station. For example, when the base station is located in an LTE system, the above-mentioned management equipment is a MME. Specifically, the network side may send the IMSI to the base station through a high layer signaling or a separately configured signaling, and the base station saves the IMSI and extracts the IMSI when the paging transmission information of the remote UE needs to be calculated. It should be noted that the above-mentioned IMSI may also be configured in the base station in communication system networking.

In the embodiments of the present disclosure, the pre-configured IMSI is usually constant, which is independent of an IMSI of an individual relay UE and an IMSI of an individual remote UE, that is, the acquisition of the IMSI is not targeted at an IMSI of a certain relay UE and an IMSI of a certain remote UE. The pre-configured IMSI may be at least one IMSI randomly selected by the network side from the universal set of configurable IMSIs or at least one IMSI selected from the universal set of configurable IMSIs according to a preset rule. The pre-configured IMSI may also be at least one IMSI randomly selected or selected by the base station according to a preset rule from a plurality of alternative IMSIs that have been selected by the network side from the universal set of configurable IMSIs.

The process of obtaining the plurality of paging transmission information by calculation may refer to the foregoing second implementation manner, that is, the PO and the PE may be acquired by substituting the pre-configured IMSI into the above formula for calculating paging transmission information. Therefore, this will not be elaborated in the embodiments of the present disclosure.

In step 203, the base station sends the paging message to the relay UE based on the two sets of paging transmission information.

Figure 2B:
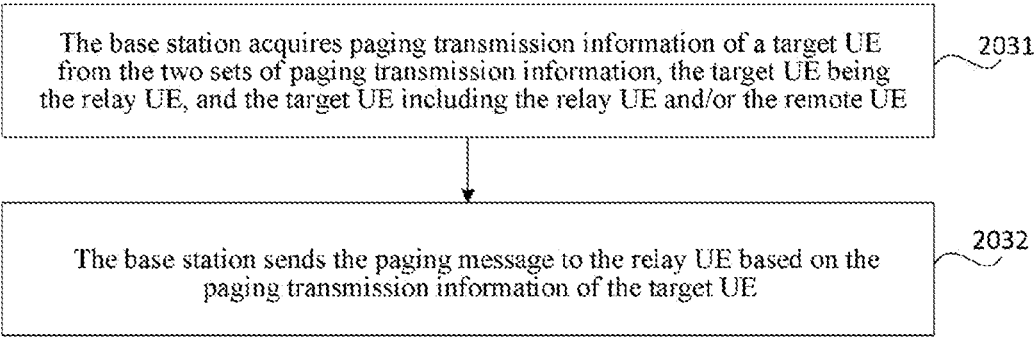
FIG. 2B is a flow chart of a method for sending a paging message to a relay UE based on two sets of paging transmission information provided by an embodiment of the present disclosure.

In the embodiments of the present disclosure, as shown in FIG. 2B, the sending the paging message to the relay UE based on the two sets of paging transmission information may include the following steps.

In step 2031, the base station determines paging transmission information of a target UE from the two sets of paging transmission information, the target UE including the relay UE and/or the remote UE.

In an actual application, the base station needs to determine the target UE according to a specific scenario, and then determine the paging transmission information so as to transmit the paging message based on the paging transmission information determined. For example, when the network side needs to perform data interaction with the relay UE, the relay UE is determined as the target UE, and the paging transmission information of the relay UE is determined as the paging transmission information of the target UE. When the network side needs to perform data interaction with the remote UE, the remote UE is determined as the target UE, and the paging transmission information of the remote UE is determined as the paging transmission information of the target UE. When the network side needs to perform data interaction with both the relay UE and the remote UE, both the relay UE and the remote UE are determined as the target UE, and the paging transmission information of the relay UE and the paging transmission information of the remote UE are determined as the paging transmission information of the target UE. Correspondingly, the paging message may carry a UE ID list, and the UE ID list may include an ID of the above-mentioned target UE.

In step 2032, the base station sends the paging message to the relay UE based on the paging transmission information of the target UE.

When the target UE includes the relay UE, the base station may send the paging message to the relay UE based on the paging transmission information of the relay UE, for example, a transmission position of the paging message indicated by the paging transmission information is specifically a location of a subframe, then the base station may send the paging message to the relay UE on the subframe indicated by the paging transmission information of the relay UE, which will not be elaborated in the embodiments of the present disclosure.

When the target UE includes the remote UE, the base station may send the paging message to the relay UE based on the paging transmission information of the remote UE; and when the paging transmission information of the remote UE includes one paging transmission information, the base station sends the paging message to the relay UE on the subframe indicated by the paging transmission information.

When the paging transmission information of the remote UE includes a plurality of paging transmission information, the process of sending the paging message to the relay UE based on the paging transmission information of the target UE specifically includes the following steps.

In step x, the base station selects one target paging transmission information from the paging transmission information of the remote UE.

For example, the base station may select one target paging transmission information from the paging transmission information of the remote UE based on a selection manner pre-agreed with the relay UE. The specific process is as follows.

In a first manner, the base station randomly selects one paging transmission information from the paging transmission information of the remote UE as the target paging transmission information.

In a second manner, the base station may obtain reference paging transmission information by calculation according to an IMSI of the remote UE, and select one paging transmission information closest to the reference paging transmission information from the paging transmission information of the remote UE as the target paging transmission information.

The IMSI of the above-mentioned remote UE is a specific IMSI, which is an IMSI of the target UE that the base station needs to perform data interaction with. An algorithm for the reference paging transmission information may refer to the formula for calculating paging transmission information provided by the second implementation manner of the second aspect in the above step 202.

Optionally, individual paging transmission information in the paging transmission information of the remote UE may be compared with the reference paging transmission information in sequence so as to determine and select one paging transmission information that is closest to the reference paging transmission information as the target paging. Since one reference paging transmission information may include information of a PO and a PF, each PF in the paging transmission information of the remote UE is firstly compared with the PF of the reference paging transmission information to determine at least one closest PF. Then, each PO in the paging transmission information in which the at least one PF is located is compared with the PO of the reference paging transmission information to determine the closest PO, and the paging transmission information in which the closest PO is located is determined as the target paging transmission information.

For example, it is supposed that the reference paging transmission information is as shown in Table 1, and the PF thereof is 1, i.e., a first radio frame, and the PO thereof is 2, i.e., a second subframe; and the paging transmission information of the remote UE includes first paging transmission information, second paging transmission information and third paging transmission information, and the specific information contents thereof may refer to the Table 1. PFs of the first to third paging transmission information may be compared with the PF of the reference paging transmission information firstly, and it is determined that the PFs of the first paging transmission information and the second paging transmission information are equal to the PF of the reference paging transmission information, that is, the PFs of the first paging transmission information and the second paging transmission information are closest to the PF of the reference paging transmission information; then POs of the first paging transmission information and the second paging transmission information are compared with the PO of the reference paging transmission information, and it is determined that the PO of the first paging transmission information is closest to the PO of the reference paging transmission information, then the target paging transmission information is the first paging transmission information, which has a PF of 2 and a PO of 2; in other words, the position indicated by the target paging transmission information is the second subframe of the second radio frame.

TABLE 1

| Paging transmission information | PF | PO |
|---|---|---|
| Reference paging transmission information | 2 | 1 |
| First paging transmission information | 2 | 2 |
| Second paging transmission information | 2 | 4 |
| Third paging transmission information | 3 | 3 |

It should be noted that the determining manner of the foregoing target paging transmission information is only a schematic description. In actual applications, there may be a plurality of other manners. For example, the base station may also determine the target paging transmission information according to a customized rule, and inform the relay UE of the customized rule; or, the base station and the relay UE may agree on one reference paging transmission information, and select one paging transmission information closest to the reference paging transmission information from the paging transmission information of the remote UE as the target paging transmission information, which will not be elaborated in the embodiments of the present disclosure.

In step y, the paging message of the remote UE is sent to the relay UE on the subframe indicated by the target paging transmission information.

For example, if the PF is 2 and the PO is 2 in the target paging transmission information, the paging message of the remote UE is sent on the second subframe of the second radio frame.

In step 204, the relay UE acquires two sets of paging transmission information.

The two sets of paging transmission information include the paging transmission information of the relay UE and the paging transmission information of the remote UE, and the paging transmission information is used for indicating the transmission position of the paging message. The two sets of paging transmission information are the same as the two sets of paging transmission information in the step 202 above.

In the embodiments of the present disclosure, the two sets of paging transmission information include the paging transmission information of the relay UE and the paging transmission information of the remote UE, where the paging transmission information is used for indicating the transmission position of the paging message, and the paging transmission information may include information of a PF and a PO. The PF is used to indicate a radio frame for sending the paging message, and the PF may include at least one paging occasion in a unit of 10 ms. The PO is used to indicate a subframe for sending the paging message in a unit of 1 ms.

The method for the relay UE to acquire the two sets of paging transmission information mainly includes the following two aspects.

In a first aspect, the relay UE acquires the paging transmission information of the relay UE.

The method for the relay UE to acquire the paging transmission information thereof may refer to a conventional method for obtaining the paging transmission information of the relay UE, for example, contents specified in Chapter 7.1 of the communication standard TS36.304, the paging transmission information of the relay UE may be calculated based on an IMSI of the relay UE, and the method for obtaining the paging transmission information of the remote UE may also refer to the following second aspect, which will not be elaborated in the embodiments of the present disclosure.

In a second aspect, the relay UE acquires the paging transmission information of the remote UE.

There may be a plurality of implementation manners for the relay UE to obtain the paging transmission information of the remote UE. The following three implementation manners will be taken as examples for illustration in the embodiments of the present disclosure.

In a first implementation manner, the relay UE acquires predetermined paging transmission information of the remote UE.

Optionally, the base station may pre-configure the paging transmission information of the remote UE and send the paging transmission information of the remote UE to the relay UE. Specifically, the base station may send the paging transmission information of the remote UE to the relay UE through system information, high layer signaling (such as radio resource control signaling, etc.) or physical layer signaling, etc. For example, the relay UE may obtain basic configuration information of a PCCH Paging Control Channel (PCCH for short) from information carried in System Information Blocks (SIBs for short) that is sent by the base station, and the basic configuration information includes the pre-configured paging transmission information of the remote UE. For example, the pre-configured paging transmission information of the remote UE may be determined from contents carried in Paging Control Channel-config (PCCH-config for short) information in a SIB2. The relay UE saves the paging transmission information of the remote UE and extracts the paging transmission information of the remote UE when needed. The process in which the relay UE acquires the predetermined paging transmission information of the remote UE is also the process in which the relay UE extracts the paging transmission information of the remote UE. It should be noted that the paging transmission information of the remote UE may also be configured in the relay UE when delivery according to a protocol, may be configured to the relay UE by the network side in other ways, or may be configured to the relay UE by manual configuration or the like, which is not limited in the embodiments of the present disclosure as long as the paging transmission information of the remote UE is the same as the paging transmission information of the remote UE configured at the base station side.

In a second implementation manner, the relay UE obtains the paging transmission information of the remote UE by calculation according to a pre-configured configuration parameter.

Optionally, the base station may pre-configure the configuration parameter and send the configuration parameter to the relay UE. Specifically, the network side may send the configuration parameter to the base station by system information, high layer signaling (such as radio resource control signaling, etc.), or physical layer signaling. For example, the relay UE obtains the basic configuration information of the PCCH through the information carried in the SIBs that are sent by the base station. The basic configuration information includes the pre-configured configuration parameter of the remote UE, for example, the pre-configured configuration parameter may be determined from contents carried in the PCCH-config information in the SIB2. The relay UE saves the configuration parameter and extracts the configuration parameter when the paging transmission information of the remote UE needs to be calculated. It should be noted that the configuration parameter may include: a paging cycle and a number of paging cycles. It should be noted that the above-mentioned configuration parameter may also be configured in the relay UE when delivery according to a protocol, may be configured to the relay UE by the network side in other ways, or may be configured to the relay UE by manual configuration or the like, which is not limited in the embodiments of the present disclosure as long as the paging transmission information of the remote UE is the same as the configuration parameter configured at the base station side.

In the embodiments of the present disclosure, the paging transmission information of the remote UE may include a plurality of paging transmission information. Optionally, the relay UE may acquire the pre-configured configuration parameter and a universal set of configurable IMSIs, and obtain the plurality of paging transmission information by calculation respectively according to the configuration parameter and the universal set of configurable IMSIs. The plurality of configuration parameters include: a paging cycle and a number of paging cycles. The calculation process may refer to the process for the base station to calculate the plurality of paging transmission information in the second implementation manner of the second aspect in the step 202 above. The same calculation method of the relay UE and the base station can ensure the consistency of sending and receiving the paging messages.

In a third implementation manner, the relay UE obtains the paging transmission information of the remote UE by calculation according to a pre-configured IMSI.

Optionally, the base station may pre-configure the IMSI and send the IMSI to the relay UE. Specifically, the base station may send the IMSI to the relay UE by system information, high layer signaling (such as radio resource control signaling, etc.), or physical layer signaling. For example, the relay UE obtains the basic configuration information of the PCCH through the information carried in the SIBs and sent by the base station. The basic configuration information includes the pre-configured IMSI, for example, the pre-configured IMSI may be determined from the contents carried in the PCCH-config information in the SIB2. The relay UE saves the IMSI and extracts the IMSI when the paging transmission information of the remote UE needs to be calculated. It should be noted that the above-mentioned pre-configured IMSI may also be configured in the relay UE when delivery according to a protocol, may be configured to the relay UE by the network side in other ways, or may be configured to the relay UE by manual configuration or the like, which is not limited in the embodiments of the present disclosure as long as the paging transmission information of the remote UE is the same as the configuration parameter configured at the base station side.

In the embodiments of the present disclosure, the pre-configured IMSI is usually constant, which is independent of an IMSI of an individual relay UE and an IMSI of an individual remote UE, that is, the acquisition of the IMSI is not targeted at an IMSI of a certain relay UE and an IMSI of a certain remote UE. The pre-configured IMSI may be at least one IMSI randomly selected by the network side from the universal set of configurable IMSIs or at least one IMSI selected from the universal set of configurable IMSIs according to a pre-configured rule. The pre-configured IMSI may also be at least one IMSI randomly selected by the base station or selected according to a pre-configured rule from a plurality of alternative IMSIs that are selected by the network side from the universal set of configurable IMSIs first. The base station acquires the IMSI and transmits the IMSI to the relay UE. No matter how the base station acquires the pre-configured IMSI, it only needs to ensure that the pre-configured IMSI is transmitted to the relay UE, and the UE uses the same calculation method as the base station to calculate and obtain the paging transmission information.

The calculation process of the paging transmission information may refer to the process for the base station to calculate the plurality of paging transmission information in the third implementation manner of the second aspect in the step 202 above. The same calculation method of the relay UE and the base station can ensure the consistency of sending and receiving the paging messages.

In step 205, the relay UE receives the paging message sent by the base station based on the two sets of paging transmission information.

For the relay UE, the relay UE may receive the paging message sent by the base station based on the paging transmission information of the relay UE, for example, a transmission position of the paging message indicated by the paging transmission information is specifically a location of a subframe, then the relay UE may receive the paging message sent by the base station on the subframe indicated by the paging transmission information of the relay UE, which will not be elaborated in the embodiments of the present disclosure.

For the remote UE, on one hand, since the contents of the paging transmission information of the remote UE acquired by the base station and the relay UE are the same, regardless of whether the base station selects the target paging transmission information from the paging transmission information of the remote UE, the paging message sent by the base station is within the range of the transmission position indicated by the paging transmission information of the remote UE, then the relay UE may monitor all subframes indicated by the paging transmission information of the remote UE to receive the paging message sent by the base station. This monitoring method can ensure to effectively receive the paging message.

In addition, by adopting the above monitoring method, the base station and the relay UE do not need to pre-agree on the selection manner, which reduces the process of configuring the selection manner through signaling, manual configuration or other manners.

It should be noted that when the selection manner pre-agreed by the base station and the relay UE is that the base station randomly selects one paging transmission information from the paging transmission information of the remote UE as the target paging transmission information, the relay UE also adopts the above monitoring method.

On the other hand, the relay UE may select one target paging transmission information from the paging transmission information of the remote UE; and monitor based on the subframe indicated by the target paging transmission information to receive the paging message sent by the base station.

The relay UE may select one target paging transmission information from the paging transmission information of the remote UE based on the selection manner pre-agreed with the base station.

To be specific, the relay UE may obtain the reference paging transmission information by calculation according to the IMSI of the remote UE; and select one paging transmission information closest to the paging transmission information as the target paging transmission information from the paging transmission information of the remote UE. The IMSI of the above-mentioned remote UE is a specific IMSI, which is an IMSI of the remote UE that is currently connected with the relay UE. An algorithm for the reference paging transmission information may refer to the formula for calculating paging transmission information provided by the second implementation manner of the second aspect in the above step 202. The specific process for selecting one paging transmission information closest to the reference paging transmission information as the target paging transmission information from the paging transmission information of the remote UE may refer to the second manner in the step 2032 above, which will not be elaborated in the embodiments of the present disclosure.

It should be noted that the determining manner of the foregoing target paging transmission information is only a schematic description. In actual applications, there may be a plurality of other manners. For example, the relay UE may also determine the target paging transmission information according to a customized rule of the base station, where the customized rule is informed to the relay UE by the base station in advance; or, the base station and the relay UE may agree on one reference paging transmission information, and one paging transmission information closest to the reference paging transmission information is selected from the paging transmission information of the remote UE as the target paging transmission information, which will not be elaborated in the embodiments of the present disclosure.

It is worth noting that since the paging message carries the UE ID list, if the paging message is monitored by the relay UE at one transmission location, the relay UE may match both its own ID and an ID of the currently connected remote UE with the UE ID list. If the ID of the relay UE matches with the UE ID list, subsequent operations are performed according to the paging message. If the ID of the remote UE connected with the relay UE matches with the UE ID list, the paging message is transmitted to the corresponding remote UE regardless of whether the currently monitored transmission location belongs to the transmission location indicated by the paging transmission information of the relay UE or the transmission location indicated by the paging transmission message of the remote UE.

In the current FeD2D communication technology, the base station may calculate the paging transmission information according to the IMSI of the relay UE, and send the paging message to the relay UE based on the paging transmission information. The relay UE only needs to monitor the subframe indicated by the paging transmission information, and when the paging message targeted at the remote UE is received, forward the paging message to the remote UE. However, in order to ensure that the relay UE can transmit the paging message to the remote UE after acquiring the paging message, the relay UE needs to report a connection state of the relay UE and the remote UE in real time, that is, each change in the connection state needs to be reported to the base station, so the network signaling overhead is relatively high.

According to the message transmitting method provided by the embodiments of the present disclosure, the base station acquires the two sets of paging transmission information, which are the paging transmission information of the relay UE and the paging transmission information of the remote UE respectively. When the base station needs to perform data interaction with the relay UE, the base station sends the paging message to the relay UE based on the paging transmission information of the relay UE; and when the base station needs to perform data interaction with the remote UE, the base station sends the paging message to the relay UE based on the paging transmission information of the remote UE, without needing to consider the connection state of the relay UE and the remote UE, thus reducing the network signaling overhead.

Moreover, in the embodiments of the present disclosure, the paging transmission information of the remote UE is independent of an individual remote UE and is not calculated for a certain remote UE. It may be regarded as a generalized concept, which is aimed at a type of remote UE, that is, the paging transmission information of the remote UE is aimed at all remote UEs served by the base station, or the paging transmission information of the remote UE is aimed at all remote UEs under the same TAC, or the paging transmission information of the remote UE is aimed at all remote UEs under the same communication system.

Figure 2C:
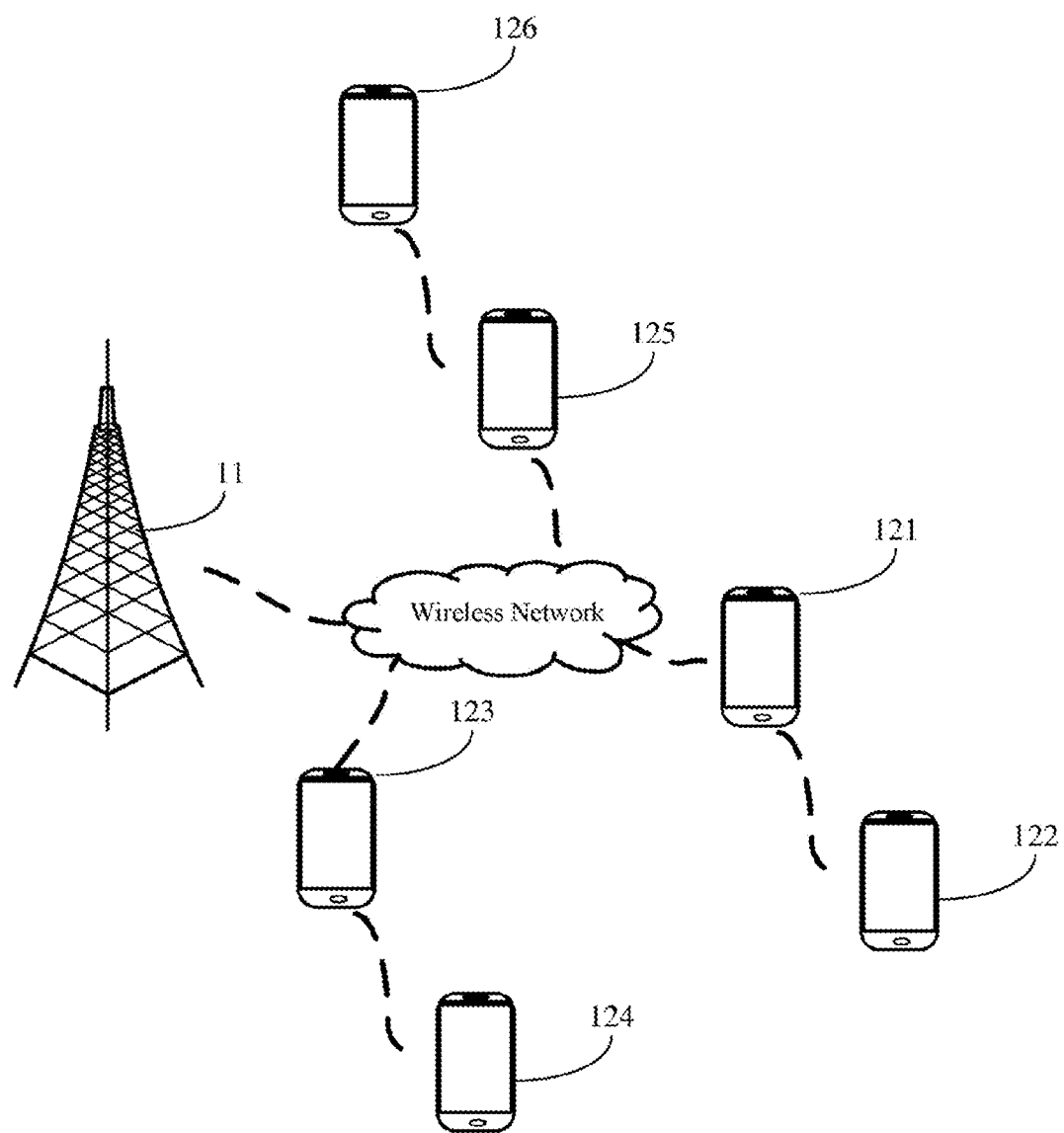
FIG. 2C is a schematic diagram of a framework of a communication system provided by an embodiment of the present disclosure.

Referring to FIG. 2C, which is a schematic diagram of a framework of a communication system, in the communication system, a relay UE 121, a relay UE 123 and a relay UE 125 all establish a wireless connection with a base station 11; moreover, a remote UE 122 is cascaded under the relay UE 121, a remote UE 124 is cascaded under the relay UE 123, and a remote UE 126 is cascaded under the relay UE 125. All the relay UE 121, the relay UE 123, and the relay UE 125 may acquire two sets of paging transmission information, where one set refers to the paging transmission information for themselves, and the other set refers to the paging transmission information for the remote UE. The sets of paging transmission information for the three relay UEs acquired by the three relay UEs may be different, and the acquisition methods of the three relay UEs may refer to conventional technologies. The paging transmission information for the remote UE acquired by the three relay UEs may be the same. For example, the paging transmission information is acquired by using the first to third implementation manners of the second aspect in the step 202 above. The paging transmission information of the remote UE is predetermined, or the configuration parameter is predetermined, or the IMSI is pre-configured, and all these configurations may be set by the network side, such as a core network, for the base station and the relay UE; therefore, the three may obtain the same paging transmission information of the remote UE by calculation based on the pre-configured contents. In this way, no matter how many remote UEs are cascaded under each relay UE, the relay UE monitors at the transmission location indicated by the paging transmission information of the remote UE. When the paging transmission information of the remote UE includes a plurality of paging transmission information, which is equivalent to that each relay UE may acquire a plurality of transmission positions, each UE may monitor the plurality of transmission positions or selectively monitor the transmission positions according to a pre-configured rule. In either case, the relay UE does not need to report the connection status with the remote UE to the base station.

In the current FeD2D communication technology, the base station may also calculate the paging transmission information according to the IMSI of the remote UE connected therewith, and send the paging message to the relay UE based on the paging transmission information. The relay UE needs to monitor POs and PFs of the relay UE itself and the remote UE to obtain the paging messages of the two.

Figure 2D:
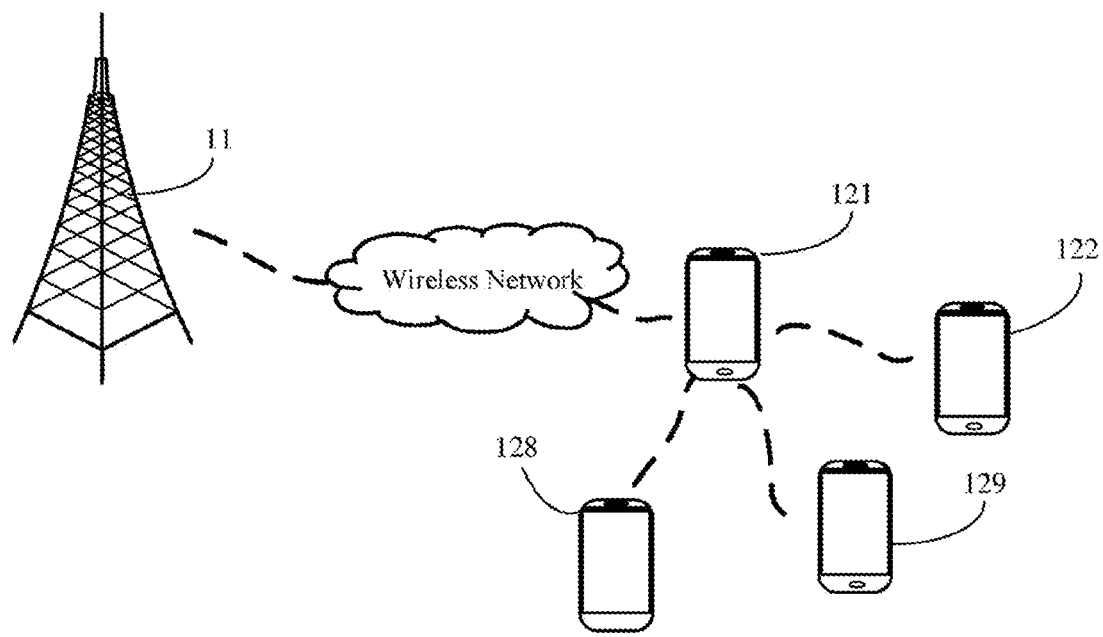
FIG. 2D is a schematic diagram of a framework of another communication system provided by an embodiment of the present disclosure.

Referring to FIG. 2D, which is a schematic diagram of a framework of a communication system, in the communication system, a relay UE 121 establishes a wireless connection with a base station 11; moreover, a remote UE 122, a remote UE 128, and a remote UE 129 are cascaded under the relay UE 121. If the current FeD2D communication technology is adopted, the relay UE 121 needs to calculate paging transmission information for the remote UE 122, the remote UE 128 and the remote UE 129 respectively to obtain three paging transmission information, and monitor paging messages based on four paging transmission information including the three paging transmission information and the paging transmission information of the relay UE 121.

However, in the embodiments of the present disclosure, the relay UE 121 only needs to acquire two sets of paging transmission information, where the range of the paging transmission information of the remote UE is fixed, that is, the remote UE 122, the remote UE 128 and the remote UE129 are corresponding to one same set of paging transmission information of the remote UE, and the relay UE 121 only needs to monitor one or more transmission positions indicated by said one set of paging transmission information of the remote UE as well as the transmission position indicated by the paging transmission information of the relay UE 121. In particular, when more remote UEs are cascaded under the relay UE 121, for example, when there are hundreds or thousands of remote UEs, in the current FeD2D communication technology, the relay UE needs to monitor hundreds or thousands of transmission locations, consuming a large amount of power. In the embodiments of the present disclosure, the relay UE only needs to monitor one or more transmission locations indicated by the paging transmission information of the remote UE acquired, and the transmission location indicated by the paging transmission information of the remote UE itself, which can effectively reduce the power consumption.

In conclusion, according to the message transmitting method provided by the embodiments of the present disclosure, the base station acquires the two sets of paging transmission information, which are the paging transmission information of the relay UE and the paging transmission information of the remote UE respectively. When the base station needs to perform data interaction with the relay UE, the base station sends the paging message to the relay UE based on the paging transmission information of the relay UE; and when the base station needs to perform data interaction with the remote UE, the base station sends the paging message to the relay UE based on the paging transmission information of the remote UE, without needing to consider the connection state of the relay UE and the remote UE, and the relay UE only needs to receive the paging message sent by the base station based on the two sets of paging transmission information, and does not need to consider how many remote UEs connected therewith, thus reducing the network signaling overhead and also reducing the power consumption of the relay UE.

Figure 3A:
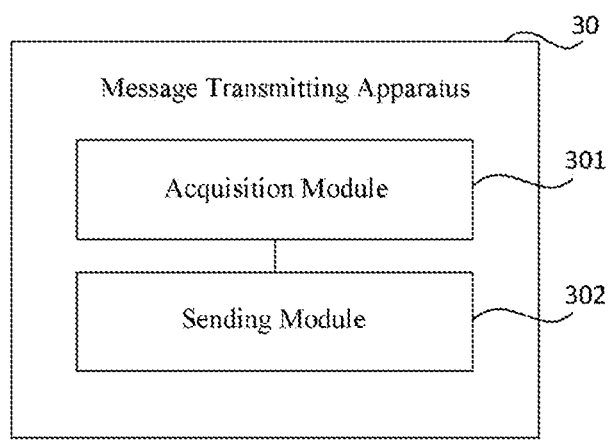
FIG. 3A is a block diagram of a message transmitting apparatus illustrated according to an exemplary embodiment.

FIG. 3A is a block diagram of a message transmitting apparatus 30 applied to a base station illustrated according to an exemplary embodiment. As shown in FIG. 3A, the apparatus 30 includes:

an acquisition module 301 configured to acquire two sets of paging transmission information, the two sets of paging transmission information including paging transmission information of a relay user equipment (UE) and paging transmission information of a remote UE, the paging transmission information being used for indicating a transmission position of a paging message, and the relay UE being a relay equipment between the base station and the remote UE; and a sending module 302 configured to send the paging message to the relay UE based on the two sets of paging transmission information.

Figure 3B:
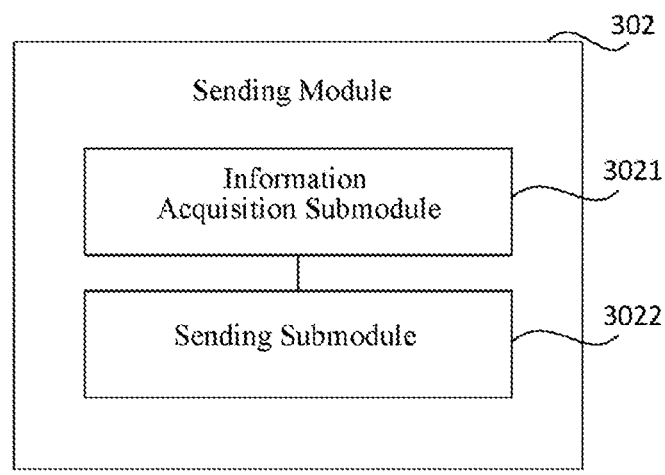
FIG. 3B is a block diagram of a sending module illustrated according to an exemplary embodiment.

Optionally, FIG. 3B is a block diagram of a sending module illustrated according to an exemplary embodiment. As shown in FIG. 3B, the sending module 302 may include:

an information acquisition submodule 3021 configured to determine paging transmission information of a target UE from the two sets of paging transmission information, the target UE including the relay UE and/or the remote UE; and a sending submodule 3022 configured to send the paging message to the relay UE based on the paging transmission information of the target UE.

Optionally, the paging transmission information of the remote UE includes a plurality of paging transmission information, and the sending submodule 3022 may include:

a selection submodule configured to, when the target UE includes the remote UE, select one target paging transmission information from the paging transmission information of the remote UE; and a message sending submodule configured to send a paging message of the remote UE on a subframe indicated by the target paging transmission information to the relay UE.

Optionally, the selection submodule may be configured to:

select one target paging transmission information from the paging transmission information of the remote UE based on a selection manner pre-agreed with the relay UE.

Optionally, the selection submodule may be specifically configured to:

randomly select one paging transmission information from the paging transmission information of the remote UE as the target paging transmission information.

Or, the selection submodule may be specifically configured to:

obtain reference paging transmission information by calculation according to an IMSI of the remote UE; and select one paging transmission information closest to the reference paging transmission information from the paging transmission information of the remote UE as the target paging transmission information.

Optionally, the acquisition module 301 may be specifically configured to:

acquire predetermined paging transmission information of the remote UE;

or, obtain the paging transmission information of the remote UE by calculation according to a pre-configured configuration parameter;

or, obtain the paging transmission information of the remote UE by calculation according to a pre-configured International Mobile Subscriber Identity (IMSI).

Optionally, the acquisition module 301 may be configured to:

after receiving a signaling for changing a transmission mode sent by the relay UE, acquire the two sets of paging transmission information, the signaling for changing a transmission mode being sent after the relay UE establishes a connection with the remote UE.

Optionally, the paging transmission information includes information of a paging occasion and a paging frame.

In conclusion, according to the message transmitting apparatus provided by the embodiments of the present disclosure, the base station acquires the two sets of paging transmission information, which are the paging transmission information of the relay UE and the paging transmission information of the remote UE respectively. When the base station needs to perform data interaction with the relay UE, the base station sends the paging message to the relay UE based on the paging transmission information of the relay UE; and when the base station needs to perform data interaction with the remote UE, the base station sends the paging message to the relay UE based on the paging transmission information of the remote UE, without needing to consider the connection state of the relay UE and the remote UE, and the relay UE only needs to receive the paging message sent by the base station based on the two sets of paging transmission information, and does not need to consider how many remote UEs connected therewith, thus reducing the network signaling overhead and also reducing the power consumption of the relay UE.

Figure 4A:
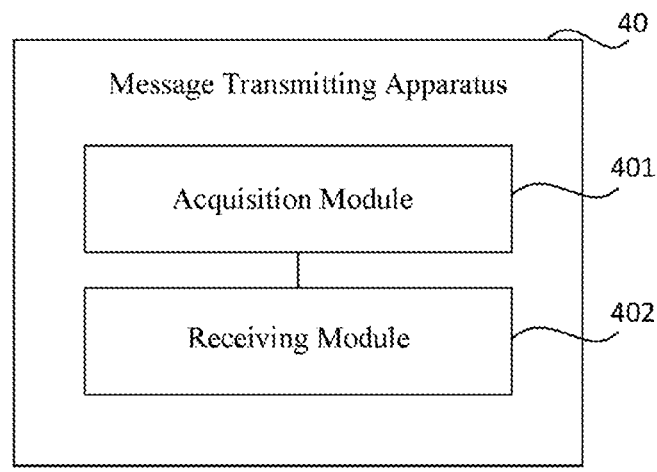
FIG. 4A is a block diagram of a message transmitting apparatus illustrated according to an exemplary embodiment.

FIG. 4A is a block diagram of a message transmitting apparatus 40 applied to a relay user equipment UE illustrated according to an exemplary embodiment. As shown in FIG. 4A, the apparatus 40 includes:

an acquisition module 401 configured to acquire two sets of paging transmission information, the two sets of paging transmission information including paging transmission information of a relay user equipment (UE) and paging transmission information of a remote UE, the paging transmission information being used for indicating a transmission position of a paging message, and the relay UE being a relay equipment between a base station and the remote UE; and a receiving module 402 configured to receive the paging message sent by the base station based on the two sets of paging transmission information.

Optionally, the receiving module 402 may be configured to:

monitor all subframes indicated by the two sets of paging transmission information to receive the paging message sent by the base station.

Figure 4B:
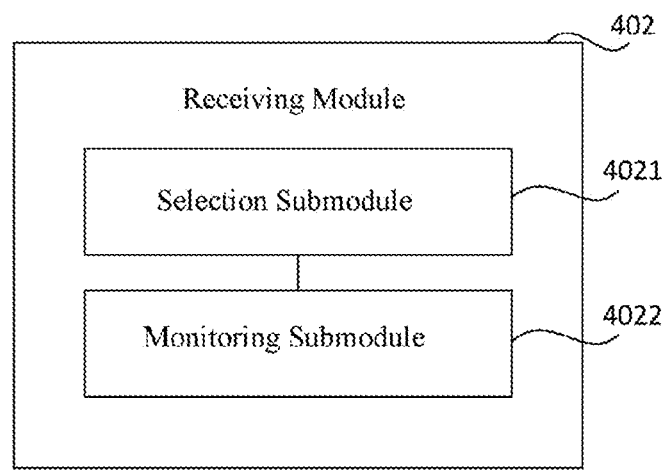
FIG. 4B is a block diagram of a receiving module illustrated according to an exemplary embodiment.

Optionally, the paging transmission information of the remote UE includes a plurality of paging transmission information. FIG. 4B is a block diagram of a receiving module illustrated according to an exemplary embodiment. As shown in FIG. 4B, the receiving module 402 includes:

a selection submodule 4021 configured to select one target paging transmission information from the paging transmission information of the remote UE; and a monitoring submodule 4022 configured to monitor based on a subframe indicated by the target paging transmission information to receive the paging message sent by the base station.

Optionally, the selection submodule 4021 may be configured to:

select one target paging transmission information from the paging transmission information of the remote UE based on a selection manner pre-agreed with the base station.

Optionally, the selection submodule 4021 may be specifically configured to:

obtain reference paging transmission information by calculation according to an IMSI of the remote UE; and select one paging transmission information closest to the reference paging transmission information as the target paging transmission information from the paging transmission information of the remote UE.

Optionally, the acquisition module 401 may be configured to:

acquire predetermined paging transmission information of the remote UE;

or, obtain the paging transmission information of the remote UE by calculation according to a pre-configured configuration parameter;

or, obtain the paging transmission information of the remote UE by calculation according to a pre-configured International Mobile Subscriber Identity (IMSI).

Figure 4C:
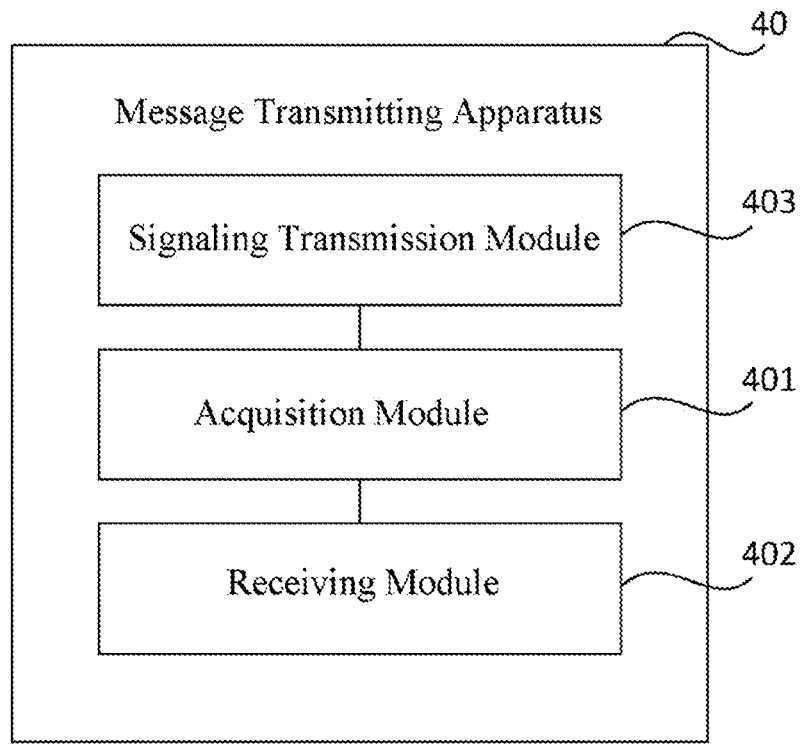
FIG. 4C is a block diagram of another message transmitting apparatus illustrated according to an exemplary embodiment.

FIG. 4-3 is a block diagram of another message transmitting apparatus illustrated according to an exemplary embodiment. The apparatus 40 further includes:

a signaling transmission module 403 configured to, before the acquiring the two sets of paging transmission information, and after the relay UE establishes a connection with the remote UE, send a signaling for changing a transmission mode to the base station.

Optionally, the paging transmission information includes information of a paging occasion and a paging frame.

In conclusion, according to the message transmitting apparatus provided by the embodiments of the present disclosure, the relay UE acquires the two sets of paging transmission information, which are the paging transmission information of the relay UE and the paging transmission information of the remote UE respectively. The paging message sent by the base station may be received based on the paging transmission information of the relay UE or based on the paging transmission information of the remote UE, without needing to consider the connection state of the relay UE and the remote UE, and the relay UE only needs to receive the paging message sent by the base station based on the two sets of paging transmission information, and does not need to consider how many remote UEs connected therewith, thus reducing the network signaling overhead and also reducing the power consumption of the relay UE.

Figure 5:
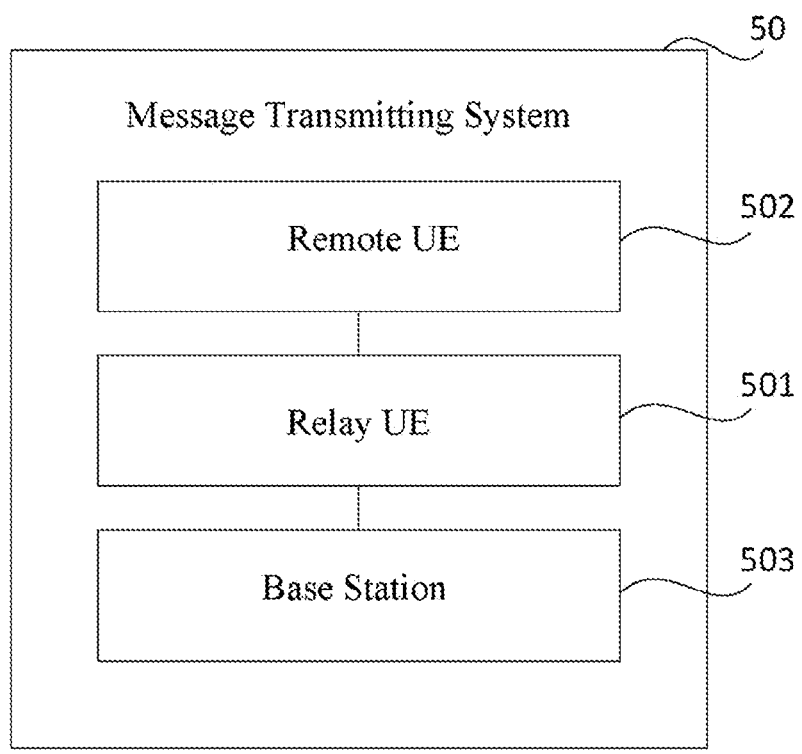
FIG. 5 is a block diagram of a message transmitting system provided by an embodiment of the present disclosure.

The embodiments of the present disclosure provide a message transmitting system 50, as shown in FIG. 5, including: a relay UE 501, a remote UE 502, and a base station 503, where the relay UE 501 may include the message transmitting apparatus shown in FIG. 3A above; and the base station 503 may include the message transmitting apparatus 50 shown in FIG. 4A or 4B.

Figure 6:
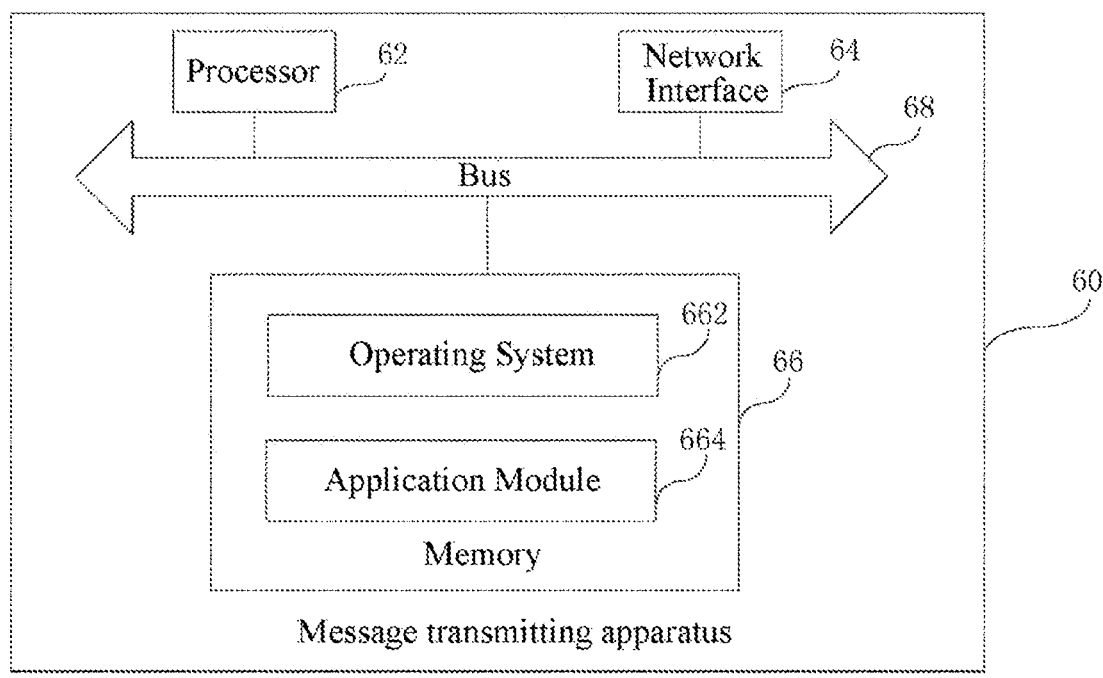
FIG. 6 is a structural diagram of a message transmitting apparatus provided by an embodiment of the present disclosure.

Referring to FIG. 6, which illustrates a structural diagram of a message transmitting apparatus 60 related to the embodiments of the present disclosure. The message transmitting apparatus 60 may be the relay UE 501 or the base station 503 mentioned above, and the message transmitting apparatus 60 includes: a processor 62 and a network interface 64.

The processor 62 includes one or more processing cores. The processor 62 executes various functional applications and data processing by running software programs and modules.

A plurality of network interfaces 64 may be provided. The network interface 64 is configured to communicate with other storage devices or network devices.

Optionally, the message transmitting apparatus 60 further includes components such as a memory 66, a bus 68, and the like. The memory 66 and the network interface 64 are connected with the processor 62 via a bus 68 respectively.

The memory 66 may be used to store software programs and modules. Specifically, the memory 66 may store an operating system 662, and an application module 664 required for at least one function. The operating system 662 may be an operating system such as Real Time Executive (RTX), LINUX, UNIX, WINDOWS, or OS X.

In some embodiments, when the message transmitting apparatus 60 is the base station 503, the network interface 64 may be a transceiver antenna (which may also be regarded as a transmitter and a receiver), and the application module 664 stored in the memory 66 may perform the above steps 202 and 203, etc.

When the message transmitting apparatus 60 is the relay UE 501, the network interface 64 may be a transceiver antenna (which may also be regarded as a transmitter and a receiver), and the application module 664 stored in the memory 66 may perform the above steps 201, 204 and 205, etc.

In exemplary embodiments, the embodiments of the present disclosure further provide a non-transitory computer-readable storage medium including instructions, such as the memory 66 including instructions, the above instructions are executable by the processor 62 in the message transmitting apparatus 60, for performing the above-described message transmitting methods. For example, the non-transitory computer-readable storage medium may be a ROM, a Random Access Memory (RAM), a CD-ROM, a magnetic tape, a floppy disc, an optical data storage device, and the like.

Those skilled in the art can clearly understand that, for convenience and brevity of description, the specific working processes of the above-described systems, apparatuses, and modules may refer to the corresponding processes in the foregoing method embodiments, and will not be elaborated herein.

It should be understood that the terminology "and/or" in the embodiments of the present disclosure is merely to describe an association relationship of contextual objects, indicating that there may be three relationships, for example, A and/or B may represent three situations: only A, both A and B, and only B. In addition, the character "/" herein generally indicates that the contextual objects are of an "or" relationship.

Those having ordinary skills in the art should understand that all or a part of the steps for implementing the foregoing embodiments may be implemented by hardware or by instructing relevant hardware through a program. The program may be stored in a computer-readable storage medium and the storage medium mentioned above may be a read-only memory, a magnetic disk or an optical disk.

Those described above are merely embodiments of the present disclosure, but are not intended to limit the present disclosure. Any modifications, equivalent substitutions and improvements made without departing from the spirit and principle of the present disclosure shall all fall in the scope of protection of the present disclosure.

What is claimed is:

1. A message transmitting method, applied to a relay user equipment (UE), comprising:
   acquiring two sets of paging transmission information, the two sets of paging transmission information comprising paging transmission information of the relay user equipment (UE) and paging transmission information of a remote UE, the paging transmission information being used for indicating a transmission position of a paging message, and the relay UE being a relay equipment between a base station and the remote UE; and
   receiving the paging message sent by the base station based on the two sets of paging transmission information;
   wherein before the acquiring the two sets of paging transmission information, the method further comprises: after the relay UE establishes a connection with the remote UE, sending a signaling for changing a transmission mode to the base station;
   wherein the acquiring the two sets of paging transmission information comprises one of the following:
   acquiring predetermined paging transmission information of the remote UE;
   obtaining the paging transmission information of the remote UE by calculation according to a pre-configured configuration parameter; and
   obtaining the paging transmission information of the remote UE by calculation according to a pre-configured International Mobile Subscriber Identity (IMSI).

2. The method according to claim 1, wherein:
   the receiving the paging message sent by the base station based on the two sets of paging transmission information comprises:

monitoring all subframes indicated by the two sets of paging transmission information to receive the paging message sent by the base station.

3. The method according to claim 1, wherein the paging transmission information of the remote UE comprises a plurality of paging transmission information, and
the receiving the paging message sent by the base station based on the two sets of paging transmission information comprises:
selecting one target paging transmission information from the paging transmission information of the remote UE; and
monitoring based on a subframe indicated by the target paging transmission information to receive the paging message sent by the base station.

4. A message transmitting apparatus, applied to a base station, comprising:
a memory for storing instructions; and
a processor for performing the instructions stored in the memory;
wherein the processor is configured to:
acquire two sets of paging transmission information, the two sets of paging transmission information comprising paging transmission information of a relay user equipment (UE) and paging transmission information of a remote UE, the paging transmission information being used for indicating a transmission position of a paging message, and the relay UE being a relay equipment between the base station and the remote UE; and
send the paging message to the relay UE based on the two sets of paging transmission information;
wherein the processor is further configured to:
after receiving a signaling for changing a transmission mode sent by the relay UE, acquire the two sets of paging transmission information, the signaling for changing a transmission mode being sent after the relay UE establishes a connection with the remote UE;
wherein the processor is further configured to perform one of the following:
acquire predetermined paging transmission information of the remote UE;
obtain the paging transmission information of the remote UE by calculation according to a pre-configured configuration parameter; and
obtain the paging transmission information of the remote UE by calculation according to a pre-configured International Mobile Subscriber Identity (IMSI).

5. The apparatus according to claim 4, wherein the processor is further configured to:
determine paging transmission information of a target UE from the two sets of paging transmission information, the target UE comprising at least one of the relay UE and the remote UE; and
send the paging message to the relay UE based on the paging transmission information of the target UE.

6. The apparatus according to claim 5, wherein the paging transmission information of the remote UE comprises a plurality of paging transmission information, and
the processor is further configured to:
when the target UE comprises the remote UE, select one target paging transmission information from the paging transmission information of the remote UE; and
send a paging message of the remote UE on a subframe indicated by the target paging transmission information to the relay UE.

7. The apparatus according to claim 6, wherein:
the processor is further configured to:
select one target paging transmission information from the paging transmission information of the remote UE based on a selection manner pre-agreed with the relay UE.

8. The apparatus according to claim 7, wherein:
the processor is further configured to:
randomly select one paging transmission information from the paging transmission information of the remote UE as the target paging transmission information.

9. The apparatus according to claim 7, wherein:
the processor is further configured to:
obtain reference paging transmission information by calculation according to an IMSI of the remote UE; and
select one paging transmission information closest to the reference paging transmission information from the paging transmission information of the remote UE as the target paging transmission information.

10. The apparatus according to claim 4, wherein the paging transmission information comprises information of a paging occasion and a paging frame.

11. A message transmitting apparatus, applied to a relay user equipment (UE), comprising:
a memory for storing instructions; and
a processor for performing the instructions stored in the memory;
wherein the processor is configured to:
acquire two sets of paging transmission information, the two sets of paging transmission information comprising paging transmission information of a relay user equipment UE and paging transmission information of a remote UE, the paging transmission information being used for indicating a transmission position of a paging message, and the relay UE being a relay equipment between a base station and the remote UE; and
receive the paging message sent by the base station based on the two sets of paging transmission information;
wherein the processor is further configured to:
before the acquiring the two sets of paging transmission information, and after the relay UE establishes a connection with the remote UE, send a signaling for changing a transmission mode to the base station;
wherein the processor is further configured to perform one of the following:
acquire predetermined paging transmission information of the remote UE;
obtain the paging transmission information of the remote UE by calculation according to a pre-configured configuration parameter; and
obtain the paging transmission information of the remote UE by calculation according to a pre-configured International Mobile Subscriber Identity (IMSI).

12. The apparatus according to claim 11, wherein:
the processor is further configured to:
monitor all subframes indicated by the two sets of paging transmission information to receive the paging message sent by the base station.

13. The apparatus according to claim 11, wherein the paging transmission information of the remote UE comprises a plurality of paging transmission information, and
the processor is further configured to:
select one target paging transmission information from the paging transmission information of the remote UE; and
monitor based on a subframe indicated by the target paging transmission information to receive the paging message sent by the base station.

14. The apparatus according to claim 13, wherein:
the processor is further configured to:
select one target paging transmission information from the paging transmission information of the remote UE based on a selection manner pre-agreed with the base station.

15. The apparatus according to claim 14, wherein the processor is further configured to:
obtain reference paging transmission information by calculation according to an IMSI of the remote UE; and
select one paging transmission information closest to the reference paging transmission information from the paging transmission information of the remote UE as the target paging transmission information.

16. The apparatus according to claim 11, wherein the paging transmission information comprises information of a paging occasion and a paging frame.

* * * * *